US 6,726,268 B2

(12) United States Patent
Leimer

(10) Patent No.: US 6,726,268 B2
(45) Date of Patent: Apr. 27, 2004

(54) RESTRAINT MECHANISM FOR FLOOR MAT

(76) Inventor: Carl D. Leimer, 3225 Tupelo Ave., Santa Rosa, CA (US) 95407

( * ) Notice: Subject to any disclaimer, the term of this patent is extended or adjusted under 35 U.S.C. 154(b) by 0 days.

(21) Appl. No.: 10/005,893

(22) Filed: Dec. 3, 2001

(65) Prior Publication Data
US 2002/0079717 A1 Jun. 27, 2002

Related U.S. Application Data
(60) Provisional application No. 60/251,536, filed on Dec. 5, 2000.

(51) Int. Cl.7 ............................................. B62D 25/20
(52) U.S. Cl. ................................................... 296/97.23
(58) Field of Search ..................................... 296/97.23

(56) References Cited
U.S. PATENT DOCUMENTS 4,673,603 A * 6/1987 Roth ....................... 296/97.23
4,692,364 A * 9/1987 Altus ...................... 296/97.23
4,751,764 A * 6/1988 Reuben ................... 296/97.23
4,967,057 A * 10/1990 Bayless et al. ............. 219/213
5,636,408 A    6/1997 Dichtel ........................ 16/6
5,658,637 A    8/1997 Volz ........................... 428/95
5,775,859 A    7/1998 Anscher ...................... 411/38
5,794,395 A * 8/1998 Reed ......................... 403/230
6,027,781 A * 2/2000 Landry et al. ............ 296/97.23
6,027,782 A    2/2000 Sherman ..................... 428/88
6,155,629 A * 12/2000 Sherman ................. 296/97.23
6,261,667 B1 * 7/2001 Yang ..................... 296/97.23

FOREIGN PATENT DOCUMENTS

JP          402299938 A * 12/1990   ............ 296/97.23

* cited by examiner

Primary Examiner—D. Glenn Dayoan
Assistant Examiner—Lori L Coletta
(74) Attorney, Agent, or Firm—Fish & Richardson P.C.

(57) ABSTRACT

Techniques and floor mat designs for holding floor mats in position in a motor vehicle without having openings in the main mat area. A peripheral portion of the floor mat can be engaged to a door sill for maintaining the position of the floor mat.

18 Claims, 5 Drawing Sheets

Flange Elevation    Border and Rib Elevation

RESTRAINT MECHANISM FOR FLOOR MAT

This application claims the benefit of U.S. Provisional Application No. 60/251,536 entitled "Floor Mat Positive Restraint System" and filed Dec. 5, 2000.

BACKGROUND

This application relates to floor mats, and in particular to floor mats for motor vehicles, including but not limited to freight trucks, light trucks, vans, busses, sports utility vehicles, and passenger cars.

Floor mats are widely used in various motor vehicles for various purposes. For example, the floor mats can provide aesthetic appearance, comfort for the driver and other occupants, protection of the vehicle floors from wear, stains and debris, or a non-slippery surface for the occupants. Conventional floor mats tend to move around in absence of a restraining mechanism. Such movement is undesirable in part because the motion exposes the floor areas to be protected and may cause the floor mat to fold up to restrict free movement of a foot of an occupant. In the driver area, the movement of the floor mat may interfere with operations of certain control pedals of the motor vehicle and thus cause safety concerns.

Therefore, there is a need for a mechanism to securely hold the floor mats in place.

SUMMARY

This application includes techniques and floor mat designs for holding floor mats in position in a motor vehicle without having openings in the main mat area. A protruded part or a peripheral portion of a floor mat can be engaged to the door sill for holding the floor mat.

In one implementation, such a floor mat has a main mat area having a central mat area and a border enclosing the central mat area. The border has a height higher than a base surface of the central mat area. In particular, at least one flange is formed to a portion of the border to protrude outside the main mat. This flange is used for engaging to a restraint object in the motor vehicle to restrain the main mat area from moving. The restrain object may be the door sill of the vehicle which is used to press against and hold the flange. In another example, the flange may have a through hole for receiving a fastening piece which is engaged to the floor to hold the floor mat in position. The floor mat may have an integral structure formed of a suitable floor mat material in which the central mat area, the border, and the flange are structural features of a unibody design.

A method for holding a floor mat to a floor of a motor vehicle is disclosed to include formation of at least one flange outside a border of a floor mat, wherein said border encloses a central mat area with a height above the central mat area, and engagement of the flange to a selected portion of the motor vehicle such as the door sill a fastening bolt engaged to the floor (e.g., a seat holding bracket) to hold the floor mat in position.

DETAILED DESCRIPTION

Figure 1:
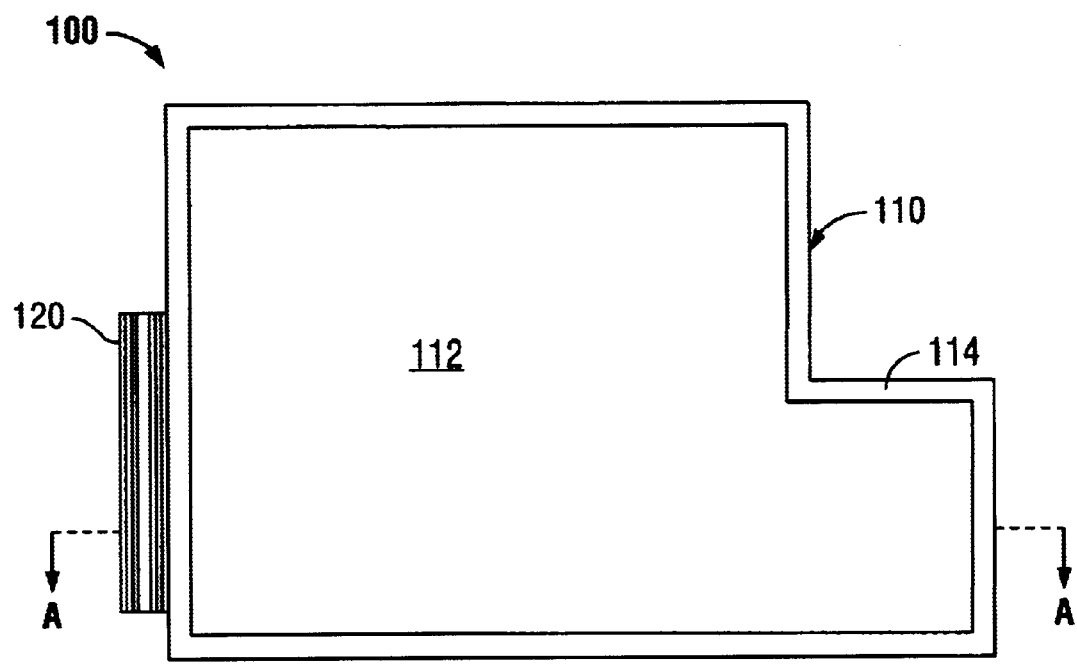
FIG. 1 shows one embodiment of a floor mat with a restraining flange for engaging the floor mat to a door sill of a motor vehicle.

FIG. 1 shows one embodiment of a floor mat 100 for use in a motor vehicle. The floor mat 100 has a main mat area 110 which includes a central mat area 112 and a border 114. The central mat area 112 is continuous without openings. The border 114 is higher than the central mat area 112 and forms a closed loop to enclose the central mat area 112. Hence, this mat design forms a tray-like structure for holding debris and protecting the covered portion of the floor of the vehicle. A flange 120 is formed to a portion of the border 114 to protrude outside the main mat 110. This flange 120 is designed for engaging to a restraint object in the motor vehicle to restrain the main mat area 110 from moving around. Notably, the flange 120 is outside the main mat area 110 and hence its operation does not affect the integrity of the main mat area 110. Unlike in some techniques for holing floor mats in position where openings are needed in the main mat area, the main mat area 110 in the present design does not have any openings and hence can effectively retain debris from getting into the floor of the vehicle.

In this embodiment, the flange 120 is specifically designed to be engaged to a door sill of the vehicle, e.g., for the door on the driver side. The flange 120 is generally in an elongated geometry along the corresponding portion of the border 114 and can be a narrow rectangular shape as illustrated. The width of the flange 120 may be designed to fit under the door sill of the vehicle for which the floor mat 100 is designed. In actual use, the floor mat 100 is installed by loosening the door sill, inserting the flange 120 under the door sill, and finally fastening the door sill so that the lower edge of the door sill is pressed against the flange 120 to hold the floor mat 100 in position. In general, no additional fastening device is needed to install such the floor mat 100 because the original equipment for securing the door sill can be used to pull the door sill with a downward pressure sufficient to restrain the floor mat 100.

Figure 2:
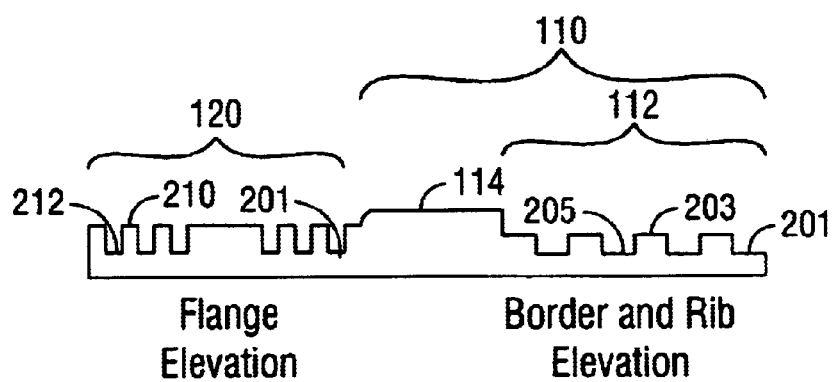
FIG. 2 shows a cross sectional view of the floor mat in FIG. 1 along line AA.

FIG. 2 shows a cross section of the floor mat 100 to reveal additional features. The central mat area 112, for example, is shown to have a certain pattern formed by ribs 203 separated by gaps 205 above the base mat surface 201. Such a pattern functionally provides a slip-resistant feature and retains debris in the gaps 205. In another aspect, the pattern also enhances aesthetic appearance of the floor mat 100. Logos, decorative patterns, letters, etc. may also be added in the region where the ribs and gaps are formed. Other protruded surface structures other than ribs 203 may also be used to form the pattern in the central mat area 112, such as needle-like features, spikes, or pegs. The border 114 is shown to have a height above the ribs 203 of the central mat area 112. Alternatively, the border 114 may have the same height as the ribs 203 or be lower than the ribs 203 but higher than the base mat surface 201.

The flange 120 may be an integrated extension of the main mat area 110. The floor mat 100 may have a unibody design as shown and may be manufactured from a molding fabrication process. Hence, the flange 120 and the main mat area 110 can be fabricated in the same process at the same time to reduce cost and to simplify the manufacturing process. In the illustrated example, the flange 120 has parallel ribs 210 along the border 114. The ribs 210 are separated by gaps 212 for improved gripping with the door sill. During installation of the floor mat 100, the underside lip of the door sill may be pressed into the ribs 210 of the flange 120 to securely hold the floor mat 100 by the original fastening equipment for the door sill.

Figure 3:
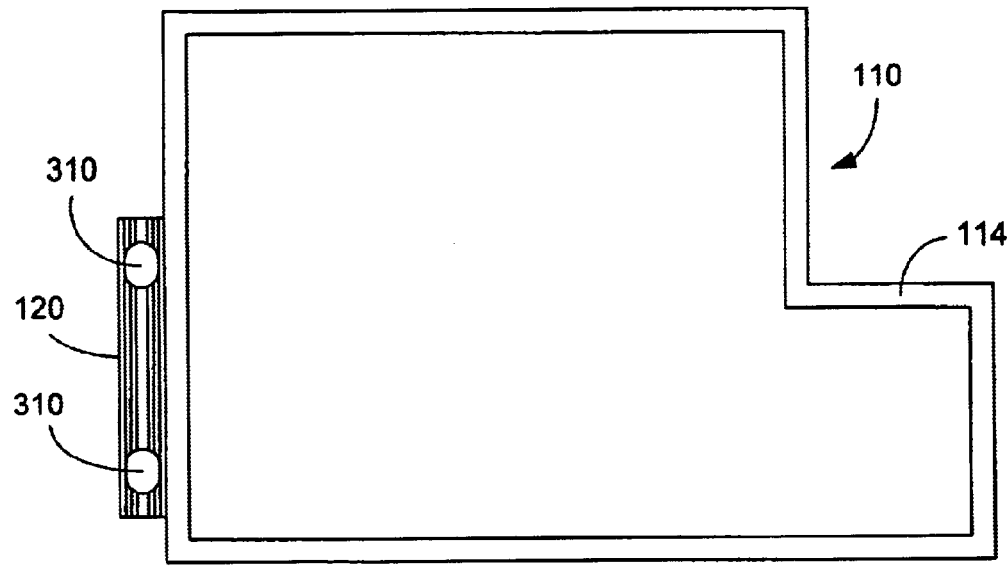
FIG. 3 shows a modified flange shown in FIG. 1.

When the original fastening equipment for the door sill cannot exert sufficient downward pressure on the flange 120 due to factors such as lack of sufficient rigidity, the flange 120 may be configured to have through holes with molded-in grommets or bosses so that the original fastening equipment can pass through the grommets to maintain the position of the floor mat. FIG. 3 illustrates this design where holes with molded-in grommets 310 are formed in the flange 120. The locations and geometries of the grommets are dictated by the specific configuration of the door sill for each individual vehicle.

Figure 4:
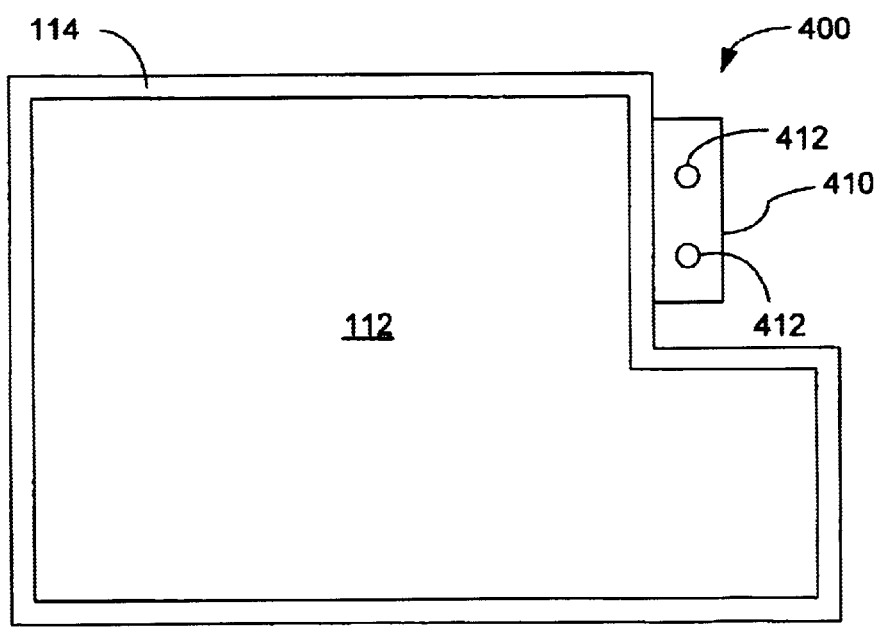
FIGS. 4, 5, 6A, 6B, 7A, and 7B show additional embodiments of floor mats with one or more restraining flanges.
Figure 5:
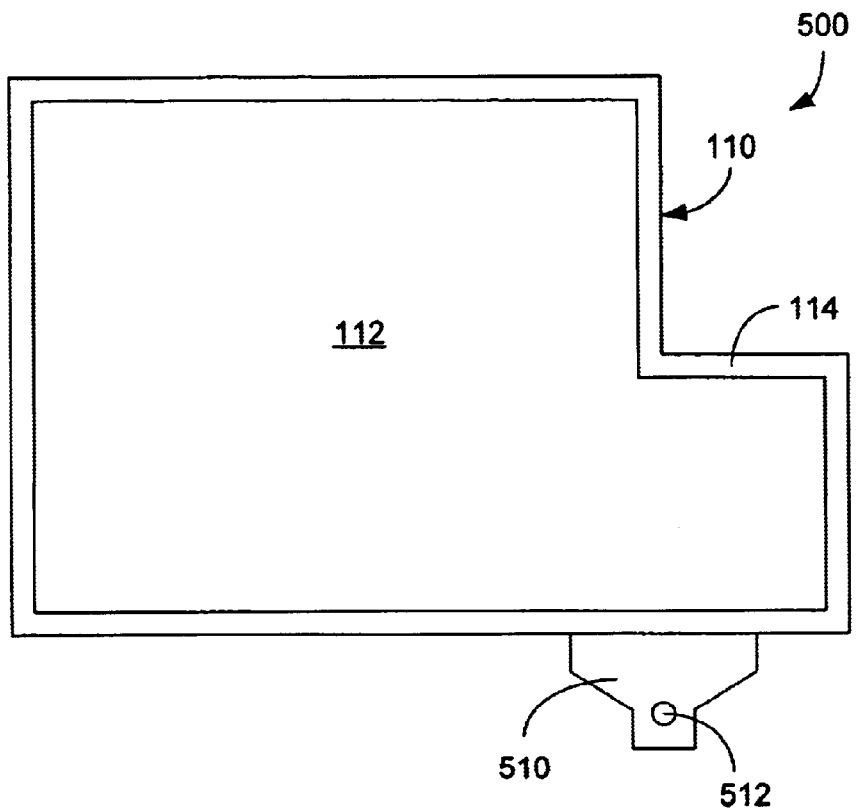

FIGS. 4 and 5 show two different embodiments 400 and 500, respectively, where the flanges 410 and 510 are designed to have through holes with molded-in grommets or bosses 412 and 512. A fastening hardware piece may be used to pass through the hole for holding the floor mat to the floor. The flanges 410 and 510 may be preferably located and designed for engaging to one or more existing fixtures within the vehicle such as mounting brackets. Similar to the floor mat 100 in FIG. 1, the integrity of the central mat area 112 is not compromised in floor mats 400 and 500 because the flanges 410 and 510 are outside the central mat area 112.

The flange 510 in the floor mat 500, for example, may be located and designed to receive a fastening bolt of a seat mounting bracket or seat fastening equipment so as to be held in place. Typically, two such flanges 510 may be used. In addition to engagement to existing equipment in the vehicle, special holes may also be formed on the floor of the vehicle so that a bolt such as a rod, pin, or screw may be engaged to such a hole to fix the floor mat.

Figure 6A:
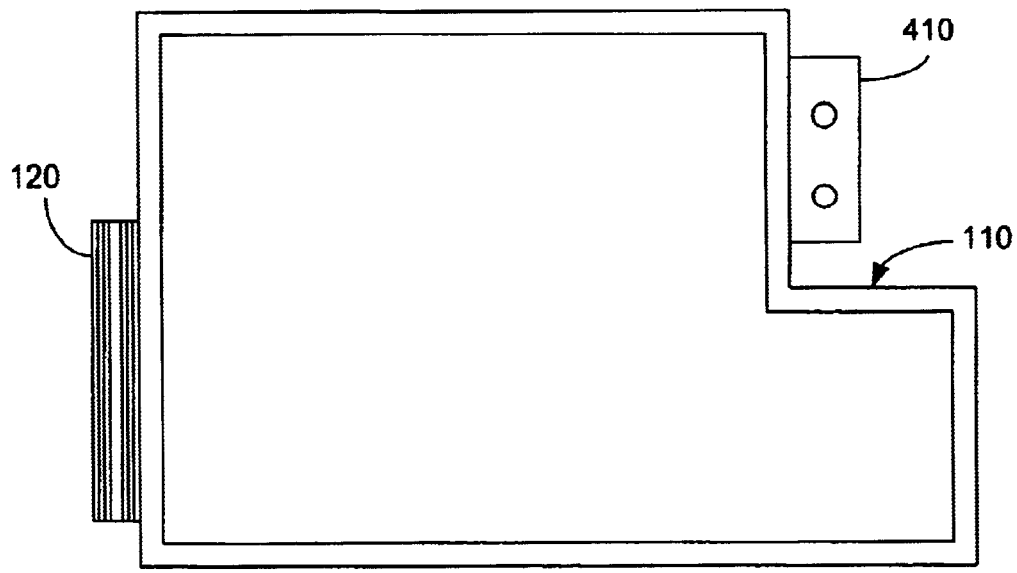
Figure 6B:
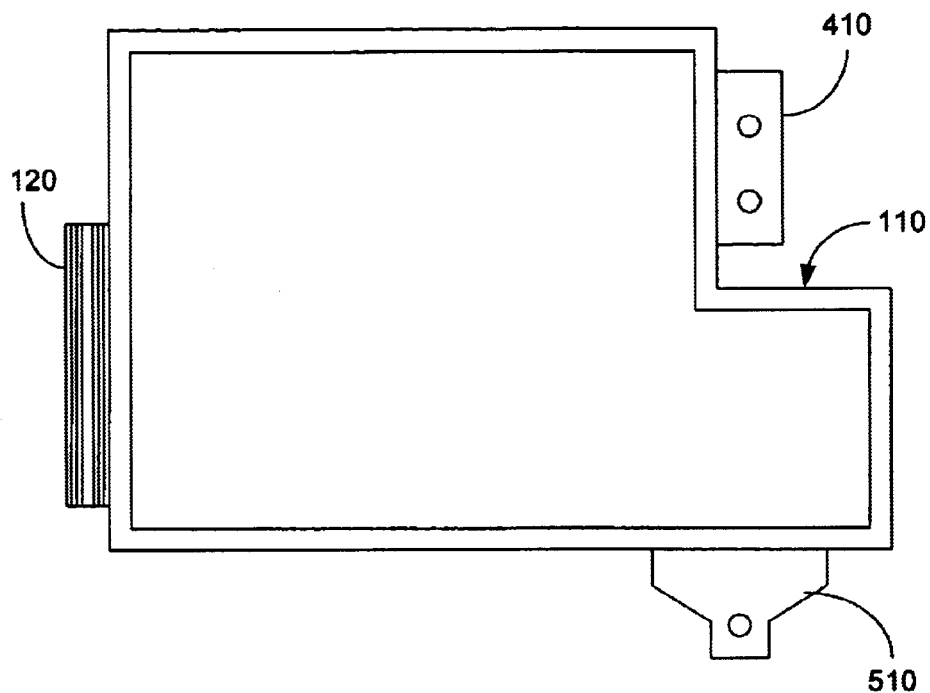

Two or more same types or different types of the above flanges may be used in combination in the same floor mat. FIGS. 6A and 6B illustrate two examples where one flange 120 for engaging to the door sill and at least another flange at a different location of the border 114 and adapted for engaging to another part of the vehicle are implemented to hold the floor mat. In general, two or more such flanges may be formed at selected and different locations on the border 114 to securely hold the floor mat in position according to specific existing original equipment within a particular vehicle.

Figure 7A:
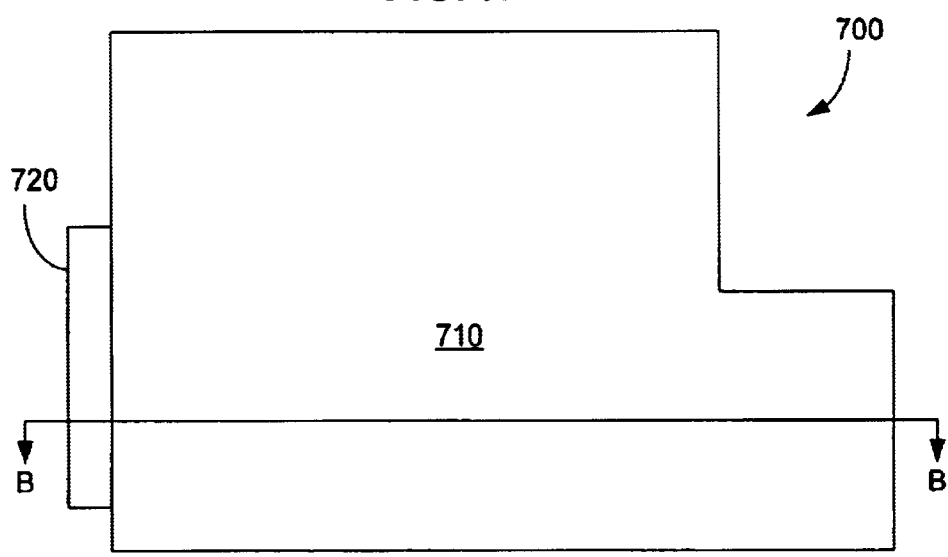
Figure 7B:
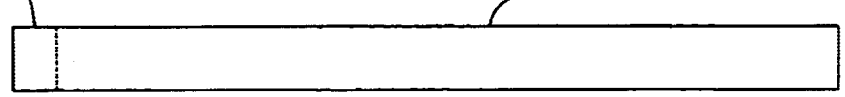

The above floor mats have a border 114 enclosing the main mat 110. The above flanges, including the flange 120 for engaging to the door sill, may be incorporated in other types of floor mats as well. In particular, the flange 120 for engaging to the door sill may be incorporated in a variety of floor mats for motor vehicles. FIGS. 7A and 7B illustrate a uniformly flat floor mat 700 that has a flange 720 for engaging to the door sill. FIG. 7B shows a cross sectional view along the line BB. This floor mat 700 has a main floor mat area 710 without a border. The flange 720 is located at one side of the main floor mat area 710 and has an elongated geometry adapted for engaging to the door sill. The surface of the flange 720 may be flat as shown or have ribs as illustrated in the flange 120 in FIG. 2. In addition, holes with molded-in grommets or bosses may also be formed in the flange 720 as shown in FIG. 3. The other types of flanges such as 410 in FIG. 4 or 510 in FIG. 5 may also be formed in the floor mat 700.

Figure 8:
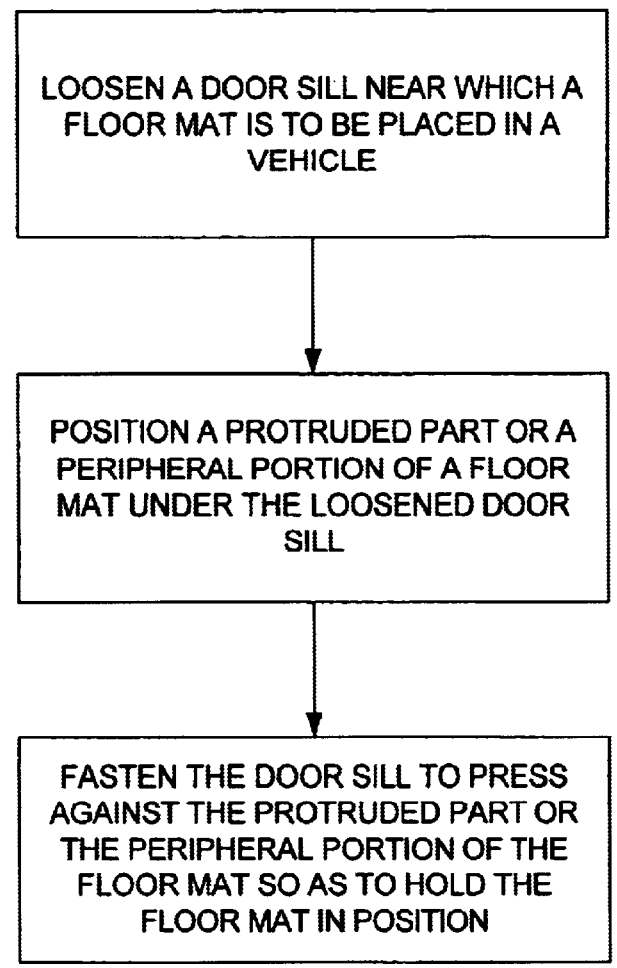
FIG. 8 is a flowchart showing a technique for using a door sill to hold a floor mat in place.

The above flanges for engaging to a door sill of the vehicle provide an effective way for holding a floor mat in position with a low cost. In general, such flanges represent a technique that uses the door sill to hold the floor mat in place. A protruded part of the floor mat such as the flange 120 or 720 or a peripheral portion of the floor mat may be placed under a loosened door sill. The door sill is then fastened to press against the protruded part or the peripheral portion to hold the floor mat. Holes with molded-in grommets or bosses may be formed in the protruded part or the peripheral portion as shown in FIG. 3 to facilitate engagement of the floor mat to the door sill. FIG. 8 illustrates this technique. In addition, another peripheral portion of the floor mat may also be engaged to a fixture in the motor vehicle such as a seat mount bracket.

The materials for the above floor mats may be any suitable materials, such as fabrics, rubbers, plastics, and various synthetic materials. The shapes of floor mats may be designed to accommodate for the specific areas with vehicles, such as the control pedal area on the driver side.

Figure 9A:
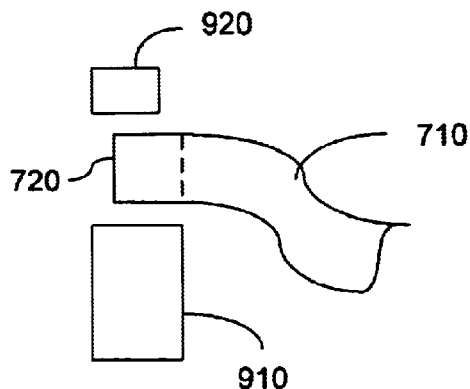
FIGS. 9A and 9B illustrate engagement of the peripheral flange of a floor mat to a door sill of a vehicle, where a underside lip of the door sill is shown to engage to ribs in the peripheral flange in FIG. 9B.
Figure 9B:
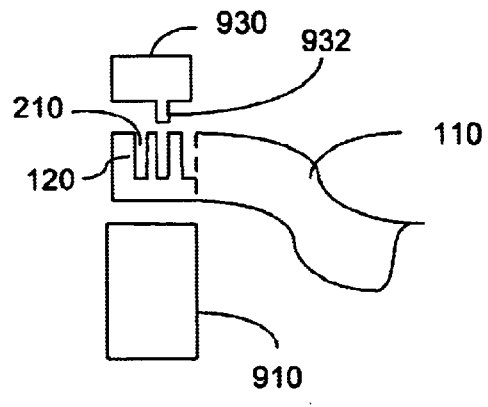

FIG. 9A illustrates the engagement of the peripheral flange 720 extended from the main floor mat 710 of a floor mat to a door sill 910 of a vehicle. A part 920 of the door sill is loosened to receive and fasten the flange 720 to the door sill 910. FIG. 9B further shows that, a floor mat in FIG. 2 may be engaged to the door sill 910 by pressing a lip 932 on a part of a part 930 of the door sill 910 into the ribs 210 in the flange 120.

Only a few embodiments are disclosed. However, it is understood that variations and enhancements may be made without departing from the spirit of and are intended to be encompassed by the following claims.

What is claimed is:

1. A floor mat for covering a portion of a floor of a motor vehicle, comprising:
   a unibody structure formed of a continuous piece of a material without separate parts, said unibody structure including:
   a main mat area having a central mat area and a border enclosing said central mat area, and
   at least one flange formed as an integral part of a portion of said border to protrude outside said main mat, wherein said flange has an elongated shape along said border and is shaped for engaging to a door sill in the motor vehicle to restrain said main mat area from moving.

2. The floor mat as in claim 1, wherein said flange has one surface configured to have ribs.

3. The floor mat as in claim 1, wherein said flange has at least one through hole for receiving a fastening piece which engages to a fixture of the motor vehicle.

4. The floor mat as in claim 1, further comprising a second flange formed to a second portion of said border to protrude outside said main mat for engaging to another restraint object in the motor vehicle to restrain said main mat area from moving, wherein said second flange has at least one through hole for engaging to another fixture of the motor vehicle.

5. The floor mat as in claim 1, wherein said central mat area is configured to have a flat surface lower than said border, and slip-resistant features protruded above said flat surface.

6. The floor mat as in claim 1, wherein said central mat area is continuous without a through hole.

7. A floor mat for covering a portion of a floor of a motor vehicle, comprising an integral and unibody structure formed of a single, continuous piece of a material, which includes a central mat area and a protruded portion at one side of said central mat area, wherein said protruded portion has an elongated shape along said side of said central mat area with a width adapted for fitting under a door sill of the motor vehicle.

8. The floor mat as in claim 7, wherein said central mat area has (1) a mat surface, (2) slip-resistant features protruded above said mat surface, and (3) a border surrounding said central mat area and having a height above said mat surface, and wherein said protruded portion is outside said border.

9. The floor mat as in claim 8, wherein said flange has ribs along said elongated shape.

10. The floor mat as in claim 7, wherein said central mat area is continuous without a through hole.

11. The floor mat as in claim 7, further comprising a second protruded portion on another side of said central mat area with at least one through hole for engaging to another fixture in the motor vehicle.

12. A method for maintaining a position of a floor mat placed on a floor of a motor vehicle, comprising:

providing at least one flange on one side of a floor mat as an integral part of and a continuous extension of a single piece of a material of which the floor mat is a part, wherein said flange is shaped to have an elongated shape along said side with a width adapted for fitting under a door sill of the motor vehicle; and engaging said flange to the door sill of the motor vehicle by pressing the door sill against said flange to hold said floor mat in position.

13. The method as in claim 12, further comprising:

forming a second flange to another side of said central mat area, wherein said second flange has at least one through hole; and engaging a fastening piece through said hole.

14. The method as in claim 12, further comprising:

forming a through hole in said flange; and engaging said hole to a seat mount bracket of the motor vehicle.

15. A method, comprising engaging a peripheral and integral portion of a floor mat under a door sill of a motor vehicle to maintain a position of the floor mat, wherein the peripheral and integral portion of the floor mat and a main part of the floor mat are different parts of a single, continuous piece of a material in a unibody design.

16. The method as in claim 15, wherein said peripheral portion has ribs formed on a surface, and the method further comprising pressing a lip of said door sill in said ribs in said engagement.

17. The method as in claim 15, wherein said peripheral portion has at least one molded-in grommet, and the method further comprising passing a fastening hardware piece for said door sill through said grommet in said engagement.

18. The method as in claim 15, further comprising engaging another peripheral portion of the floor mat to a fixture in the motor vehicle.

* * * * *